United States Patent [19]

Grebe

[11] 4,057,138
[45] Nov. 8, 1977

[54] APPARATUS FOR ROUTING LOGS

[75] Inventor: Edward Andrew Grebe, Wauwatosa, Wis.

[73] Assignee: Wisconsin Bridge & Iron Co., Milwaukee, Wis.

[21] Appl. No.: 655,635

[22] Filed: Feb. 5, 1976

[51] Int. Cl.² .............................................. B65G 47/00
[52] U.S. Cl. .................................. 198/480; 198/368; 198/577; 198/598; 198/722; 214/1 P
[58] Field of Search ................. 198/31 R, 31 AA, 25, 198/38, 103, 209, 211, 212, 185, 366, 368, 370, 372, 398, 441, 480, 577, 598, 722, 859; 214/1 P, 11 R; 209/82

[56] References Cited

U.S. PATENT DOCUMENTS

| 1,838,193 | 12/1931 | Rundell | 198/31 AA |
| 3,000,519 | 9/1961 | Purnell | 198/185 |
| 3,370,494 | 2/1968 | Schenck | 198/185 |
| 3,400,803 | 9/1968 | Lanore | 198/103 |
| 3,400,837 | 9/1968 | Dalik | 214/1 P |
| 3,570,648 | 3/1971 | Gillespie et al. | 198/185 |

FOREIGN PATENT DOCUMENTS

| 41,364 | 6/1969 | Finland | 214/1 P |
| 175,053 | 4/1961 | Sweden | 209/82 |

Primary Examiner—Evon C. Blunk
Assistant Examiner—Joseph E. Valenza
Attorney, Agent, or Firm—Andrus, Sceales, Starke & Sawall

[57] ABSTRACT

An apparatus for routing logs to various locations in a sawmill. The logs are conveyed in end-to-end relation on a conveyor and pass beneath a rotatable log kicker unit having a series of radially extending arms which, when rotated, will kick the log laterally to either side of the conveyor for delivery to sawing operations. Located at the downstream end of the log kicker unit is a movable gate disposed to be engaged by the end of the log as it is moved laterally by the log kicker to align the laterally discharged logs. By moving the gate out of the conveying path, the log can be conveyed through the log kicker unit to a third delivery location.

4 Claims, 6 Drawing Figures

APPARATUS FOR ROUTING LOGS

BACKGROUND OF THE INVENTION

In a sawmill, logs are debarked and after debarking are conveyed to a number of sawing or chipping operations, depending on the size and quality of the logs. For example, larger logs will be conveyed to a sawmill for sawing into larger dimensional lumber, while smaller logs may be conveyed to a sawmill for sawing into smaller pieces of dimensional lumber, such as 2 × 4's, while the smaller, lower quality logs can be delivered to chippers for use in papermaking operations.

In the sawmill operation a mechanism is frequently incorporated in the conveyor system to sort or direct the logs to different locations depending on their size and quality. In the past one type of routing mechanism has taken the form of pivoted arms actuated by fluid cylinders which engage the log and move it laterally from the conveyor for delivery to a sawing operation. Other types of log sorting or routing mechanisms have taken the form of tilting platforms, which when tilted, would cause the log to roll laterally to either side of the conveyor for delivery to the sawing operation.

Recently the speed of the conveying system in a sawmill operation has been substantially increased, and as a result the conventional log routing or sorting mechanisms have been unable to keep pace with the high speed conveying. Both the pivoting arm mechanism and the tilting platform mechanism act on a reciprocating principle and require that the mechanism be moved in one direction to kick the log from the conveyor and then be returned to its original position before contact is made with a succeeding log, As the logs may frequently be travelling at speeds up to 380 feet per minute on the conveyor, the reciprocating types of log kickers have not been satisfactorily adapted to high speed operation.

SUMMARY OF THE INVENTION

The invention relates to an apparatus to be associated with high speed conveyors for directing logs to various locations in a sawmill. The logs are conveyed in end-to-end relation by a conveyor and pass beneath a rotatable log kicker unit having a series of radially extending arms, which when rotated through a predetermined arc, will kick the log laterally to either side of the conveyor for delivery to sawmill operations.

Located at the downstream end of the log kicker unit, is a movable gate adapted to be engaged by the end of the log as it is moved laterally by the log kicker. The gate serves to properly align or position the logs being delivered laterally from the conveyor. By moving the gate out of the conveying path, the logs can be conveyed through the log kicker unit to a third delivery location.

The log kicking mechanism of the invention can be rotated in either direction to kick the logs laterally to either side of the conveyor. The arms are rotated through an arc generally equal to the arc between adjacent arms, so that after a log is kicked or delivered laterally from the conveyor, the arms will immediately be in position for the next kicking operation. As the log kicking mechanism does not move in a reciprocating path of travel, the speed of the unit is substantially increased over prior types so that the log kicker can keep pace with high speed conveying systems and it is not necessary to momentarily interrupt movement of the conveyor while the log is being kicked from the conveyor. This results in a substantially faster production rate then with prior systems.

The movable gate, which is adapted to be engaged by the end of the log as it is moved laterally from the conveyor by the kicking mechanism, acts to properly align the logs on the laterally extending auxiliary conveyors as the logs travel to the sawmill operation. By moving the gate to a non-obstructing position, the logs can be moved straight through the log kicking unit to a third delivery location.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
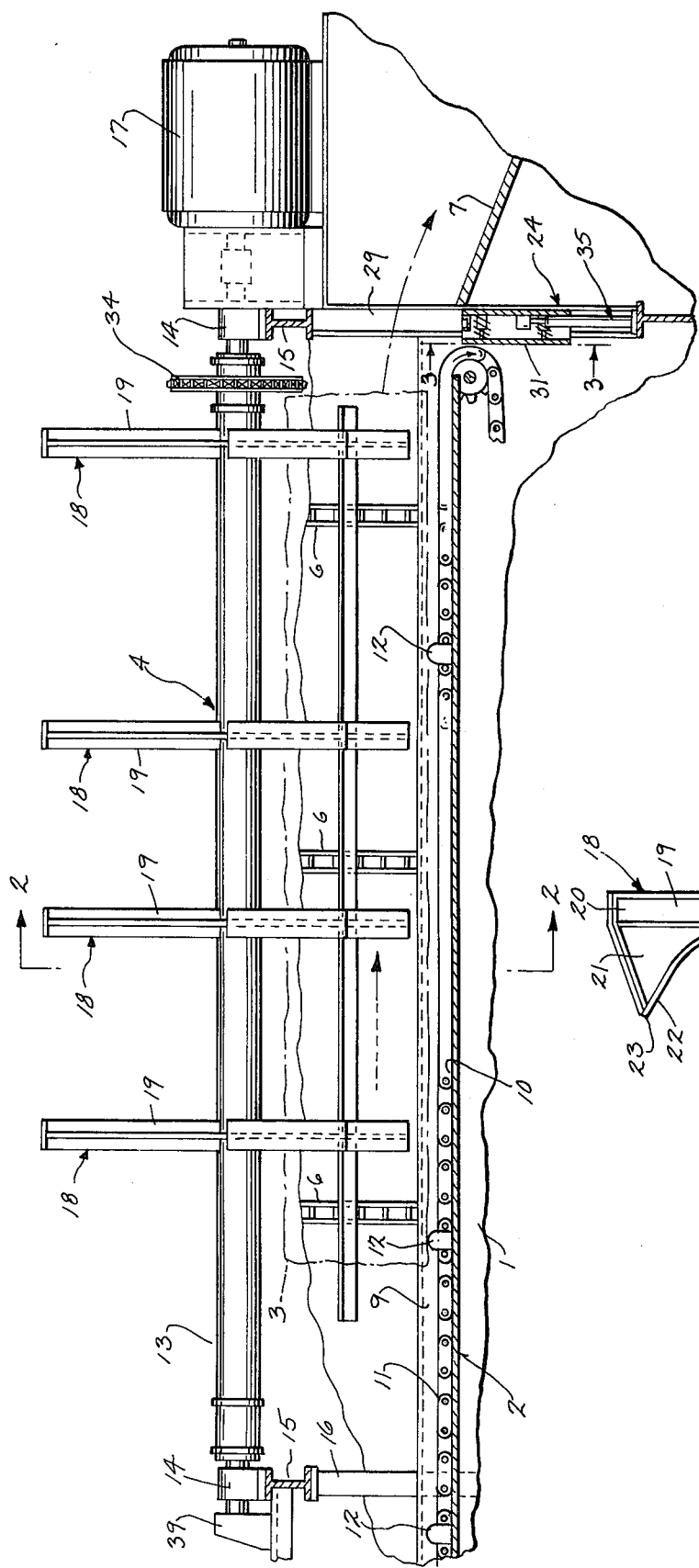
FIG. 1 is a side elevation of the apparatus of the invention with parts broken away in section.

The drawings illustrate a supporting structure or frame 1 which supports a conveyor 2 that is adapted to convey a series of logs 3 in end-to-end relation. Located above the conveyor 2 is a log kicker unit 4 which can be operated to kick or deliver the logs laterally onto conveyors 5 and 6 which are located on opposite sides of the conveyor 2. In operation, the logs being delivered to the conveyors 5 and 6 will be conveyed to various sawmill operations.

A chute 7 is located at the downstream end of the conveyor 2 and logs which are not kicked to either side of the conveyor by the log kicker unit 4 will pass down the chute 7 to a further sawmill operation which can be a chipping machine for chipping the logs for papermaking.

Figure 2:
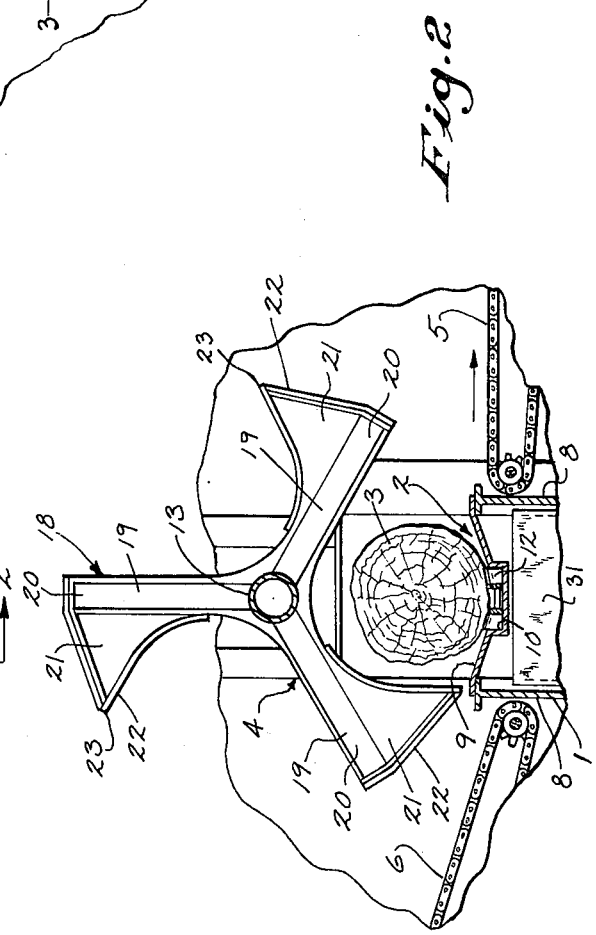
FIG. 2 is a transverse section taken along line 2-2 of FIG. 1.

As shown in FIG. 2, the conveyor 2 is supported by a pair of side walls 8 which are part of the frame 1, and the conveyor includes an upper support plate 9 attached to the upper ends of side walls 8 and formed with a central recess 10 that receives a roller chain 11 of the type used in log conveying operations, and having a series of cradle attachments 12 secured at spaced locations to the chain. The chain 11 is mounted for travel within the recess 10 of support plate 9, and the logs 3 rest on the cradles 12 and are conveyed longitudinally, as indicated by the arrow in FIG. 1.

The log kicker unit 4 includes a shaft 13 which is located above conveyor 2 and the axis of the shaft is generally parallel with the direcion of travel of the chain 11. The ends of the shaft 13 are journalled within bearing blocks 14 mounted on cross beams 15 and the ends of the beams 15 are supported on vertical columns 16 which extend upwardly from the frame 1. The shaft 13 is driven by hydraulic motor 17 which is operably connected to one end of the shaft.

As best illustrated in FIG. 2, the kicker unit 4 includes a series of kickers 18 which are secured in spaced relation along the length of the shaft 13. Each of the kickers 18 is provided with a series of radially extending arms 19, each of which includes a central section 20, a web portion 21 which is secured edgewise to the central section, and a flange 22 which is secured to the edge of the web 21.

While the drawings illustrate one end of each arm 19 terminating in a generally pointed tip 23, it is contemplated that both sides of each arm can be curved outwardly in a pointed tip, depending upon the size of the logs being conveyed in the sawmill operation. The pointed tips 23 are normally used for larger diameter logs, and as viewed in FIG. 2, larger logs would be moved to the right onto conveyor 5, while smaller diameter logs would be moved to the left onto conveyor 6.

The length of the logs is such that all four kickers 18 simultaneously engage each log as the shaft 13 is rotated. The spacing of the kickers 18 along the shaft 13 is not critical, and the spacing is generally determined by the load requirements so that the kickers 18 will be normally located in the area where the thickest portion of the logs will be encountered.

FIG. 2 illustrates that each kicker 18 includes three arms 19 which are located approximately 120° apart. The number of arms on each kicker can vary depending upon the diameter of the logs being conveyed, but it has been found that three arms 19 is particularly satisfactory for most sawmill operations.

As the logs travel along the conveyor 2, the kicker unit 4 will be actuated either manually by an operator or through an automatic sensing mechanism to rotate the shaft 13 in either direction to thereby kick the log, depending on its size, laterally either onto the conveyor 5 or 6. The arms are rotated through an arc generally equal to the arc between adjacent arms, or as shown in the drawings, through an arc of about 120°. After the log has been delivered laterally, the next succeeding log will pass between the two downwardly extending arms, as shown in FIG. 2, and the next succeeding log will be delivered laterally to either of the conveyors 5 or 6, depending on its size.

Located downstream of the kicker unit 4 is a gate assembly 24 which is movable from an obstructing position, in which it is aligned with the path of travel of logs 3 on conveyor 2, to a lowered or non-obstructing position where it will not interfere with the logs being discharged from the end of the conveyor 2.

Figure 3:
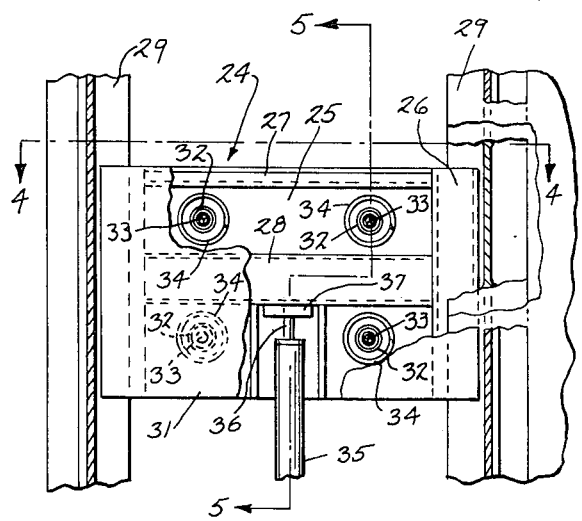
FIG. 3 is a transverse section taken along line 3-3 of FIG. 1 and showing the movable gate.
Figure 5:
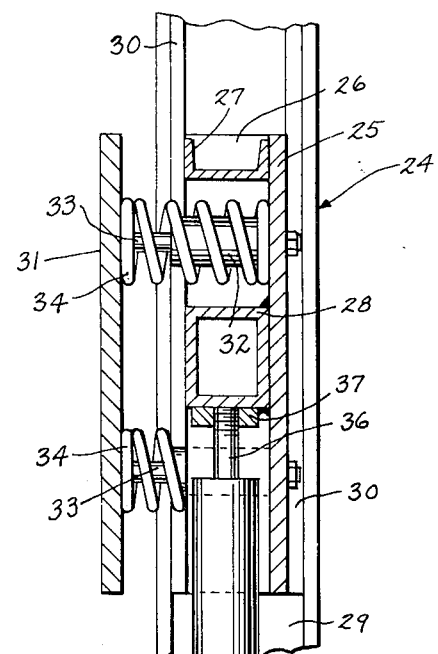
FIG. 5 is a section taken along line 5-5 of FIG. 3.
Figure 4:
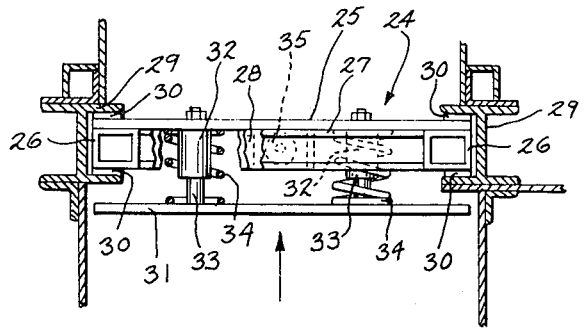
FIG. 4 is a section taken along line 4-4 of FIG. 3.

The details of the gate assembly are most clearly illustrated in FIGS. 3–5, and the gate assembly includes a rear plate 25 which is secured to a pair of vertical side beams 26. A top channel 27 is connected between the upper ends of the side beams 26 and a central beam 28 extends horizontally between the central portions of side beams 26.

The gate assembly is mounted for vertical movement between a pair of I-beams 29 which serve as guideways. As shown in FIG. 4, strips 30 formed of a material having a low co-efficient of friction, such as polyethylene, are attached to the flanges of the I-beams 29 and enable the gate assembly to slide within the flanges or webs of the I-beam without jamming. As illustrated in FIG. 4, the rear plate 25 rides against one set of strips 30, while the forward surfaces of the vertical beams 26 ride against the other strips 30.

Located forwardly of the back plate 25 is a front plate 31 and telescopic members 32 and 33, which are connected to the rear plate and front plate, respectively, serve to interconnect the plates.

As the conveyor 2 operates continuously, a log being kicked laterally from the conveyor 2 by the kicker unit 4 will move not only laterally but forwardly. When the gate assembly 24 is in the upper or obstructing position, the end of the log will strike the front plate 31 as it is being ejected laterally by the kicker unit and therefore a provision is made to provide a cushioning effect to withstand the impact of the log. The cushioning is accomplished by a series of coil springs 34 which are disposed around the telescopic members 32 and 33 and extend between the rear plate 28 and front plate 31, as best illustrated in FIG. 4. With this construction, the force of the log hitting the front plate 31 will be resisted and cushioned by springs 34.

The gate assembly 24 is adapted to be raised and lowered by a fluid cylinder unit 35. A ram or piston rod 36 of the cylinder unit 35 is attached to a bracket 37 mounted on the lower surface of the central beam 28 and the lower end of the cylinder is connected to the frame 1.

When the ram 36 is retracted, the gate assembly 24 will be moved to a lower or non-obstructing position, as shown in FIG. 1, and with the kickers 18 stationary, the logs can be delivered straight through the kicker unit 4 to the chute 7. The gate assembly 24 is raised to an obstructing position in synchronization with operation of the kickers 18, so that as a log is kicked laterally from the conveyor the end of the log will strike the raised gate assembly 24, to thereby properly align the ejected logs on the conveyors 5 and 6.

To lock the log kicker unit 4 during periods when it is not being rotated by the motor 17, a standard brake unit 39 is associated with one end of the shaft 13. By actuating the brake unit, the shaft and kicker unit will be prevented from freely rotating.

The hydraulic motor can be operated either manually through a control system or by mean of automatic sensors which sense the diameter of the logs on the conveyor and automatically act to rotate the kicker units 4 in the desired direction to eject the logs laterally or permit the logs to pass through the kicker unit 4 to the chute 7.

With manual operation the operator will observe the logs as they are moving along the conveyor and will operate the hydraulic motor 17 and cylinder units 35 for the gate assembly 24 to direct each individual log to the desired location.

Figure 6:
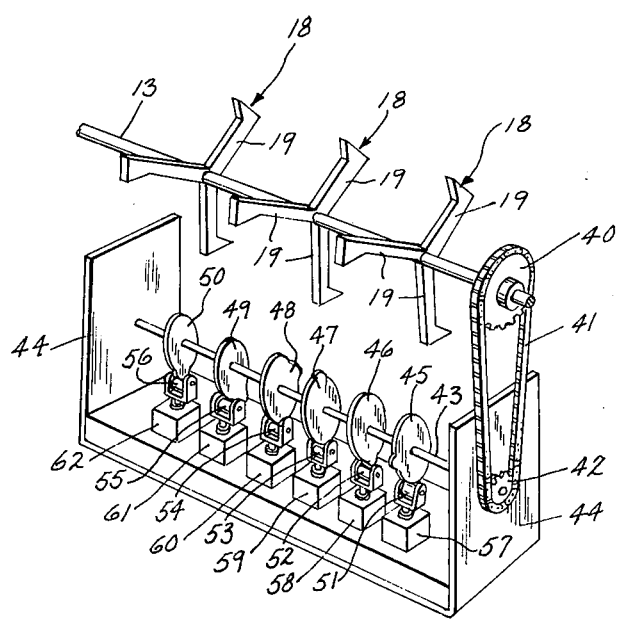
FIG. 6 is a schematic perspective view showing the cam operated control mechanism for operating the kicker unit.

FIG. 6 illustrates schematically the cam operated control mechanism for operating the kicker unit 4. A sprocket 40 is secured to shaft 13 and sprocket 40 is connected by chain 41 to a sprocket 42 on cam shaft 43 that is journalled in supports 44. Preferably, the sprocket 42 on cam shaft 43 has a diameter one-third that of sprocket 40, so that 120° rotation of kicker shaft 13 will result in 360° rotation of cam shaft 43. If the kickers 18 have other than three arms 19, the size of the sprockets 40 and 42 can be varied accordingly, so that rotation of the arms 19 through an arc necessary to eject the log from the conveyor, will result in 360° rotation of the cam shaft 43.

A series of six cams 45–50 are mounted on cam shaft 43, and followers 51–56 are associated with each cam. Followers 51–56 serve to activate switches 57–62 which are connected in the control circuit with the valves of the hydraulic system and the brake 39.

Switches 57-59 associated with cams 45-47 are activated when the kicker shaft is rotated in one direction while switches 60-62 associated with cams 48-50 are operably connected in the electrical circuit when the kicker shaft is rotated in the opposite direction. As an example, when the operator pushes a control button to operate the kicker unit in either a left or right direction, the valving of the hydraulic system will be operated to supply hydraulic fluid to motor 17 to rotate the shaft 13 in the desired direction, and rotation of shaft 13 will act to rotate the cam shaft 43. If the direction of rotation is such that it activates cams 45-47 and switches 57-59, the cam 45 will initially actuate switch 57 which operates the valving of the hydraulic system so that the fluid supplied to motor 17 will operate the motor at a high speed. After about 270° of rotation of cam shaft 43, switch 57 will be deactivated and cam 46 will actuate switch 58 which operates the hydraulic valving in a manner to supply a lesser flow rate of fluid to the motor 17, thereby decreasing the speed of the motor and the kicker shaft 13. When the cam shaft 43 approaches a full 360° rotation — the kicker shaft 13 having rotated through 120° — switch 58 is deactivated to cut off the supply of fluid to the motor and cam 47 activates switch 59 to energize the brake 39 and stop rotation of shaft 13. This arrangement enables the kickers 18 to rotate rapidly through a major portion of their arc of rotation, then slow to a complete stop.

The cams 48-50 and switches 60-62 operate in the identical manner on reversal of rotation of the kickers.

The invention provides an improved system to be used with a high speed conveyor for routing or directing logs to various locations in a sawmill without the necessity of stopping the conveyor. Through operation of the kicker unit 4, the logs can be directed laterally to either side of the conveyor 2 for the desired sawmill operation. By not operating the log kicker and moving the gate assembly to a non-obstructing position, the logs can move straight through the log kicking unit and be delivered to the chute 7.

While the drawings have illustrated the use of a hydraulically operated system, it is contemplated that other systems, such as electrical or pneumatic, can be utilized.

Various modes of carrying out the operation are contemplated as being within the scope of the following claims particularly pointing out and distinctly claiming the subject matter which is regarded as the invention.

I claim:

1. An apparatus for routing logs to various locations, comprising a conveyor to convey logs in an end-to-end relation, a rotatable log kicker disposed above the conveyor and mounted for rotation about an axis disposed generally parallel to the direction of travel of the conveyor, said log kicker having a plurality of outwardly extending arms disposed to engage the log on the conveyor as the kicker is rotated in either direction to move the log laterally to either side of the conveyor, reversible drive means operably connected to the log kicker and operable to rotate the arms through an arc of travel generally equal to the arc between adjacent arms, means operably connected to the drive means for operating said drive means at a first speed through a first portion of said arc of travel and for operating said drive means at a second speed during a second position of said arc of travel, said second speed being slower than said first speed, and brake means for stopping rotation of said arms when said arms have completed travel through said arc.

2. The apparatus of claim 1, wherein at least one side of each arm is generally curved and terminates in a pointed tip.

3. The apparatus of claim 1, wherein said log kicker includes a shaft located generally parallel to the direction of travel of said conveyor and said log kicker includes a plurality of groups of arms with each group spaced longitudinally along said shaft, each group including at least three circumferentially spaced arms.

4. The apparatus of claim 1, and including a second conveyor located laterally to one side of said first conveyor for receiving logs discharged in one direction from said first conveyor, and a third conveyor located laterally to the other side of said first conveyor for receiving logs discharged in the other direction from said first conveyor.

* * * * *

UNITED STATES PATENT AND TRADEMARK OFFICE
CERTIFICATE OF CORRECTION

PATENT NO. : 4,057,138
DATED : November 8, 1977.
INVENTOR(S) : EDWARD ANDREW GREBE It is certified that error appears in the above-identified patent and that said Letters Patent are hereby corrected as shown below:

Column 1, Line 26, Cancel "sawmilll" and substitute therefor ---sawmill---, Column 1, Line 34, Cancel ",As" and substitute therefor ---As---, Column 2, Line 2, Cancel "then" and substitute therefor ---than---, Column 2, Line 60, Cancel "direcion" and substitute therefor ---direction---, Column 4, Line 39, Cancel "mean" and substitute therefor ---means--- Column 6, Line 23, Claim 1, Cancel "position" and substitute therefor ---portion---.

Signed and Sealed this

Second Day of May 1978

[SEAL]

Attest:

RUTH C. MASON
Attesting Officer

LUTRELLE F. PARKER
Acting Commissioner of Patents and Trademarks